(12) United States Patent
Finerman et al.

(10) Patent No.: US 6,288,171 B2
(45) Date of Patent: *Sep. 11, 2001

(54) MODIFICATION OF THERMOPLASTIC VULCANIZATES USING RANDOM PROPYLENE COPOLYMERS

(75) Inventors: Terry Finerman, Akron; Maria D. Ellul, Silver Lake Village; Sabet Abdou-Sabet, Akron, all of OH (US); Sudhin Datta; Avi Gadkari, both of Houston, TX (US)

(73) Assignees: Advanced Elastomer Systems, L.P., Akron, OH (US); Exxon Chemical Patents, Inc., Baytown, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,492

(22) Filed: Jul. 1, 1998

(51) Int. Cl.$^7$ ..................................................... C08J 3/24
(52) U.S. Cl. .......................................... 525/192; 525/194
(58) Field of Search ...................................... 525/192, 194

(56) References Cited

U.S. PATENT DOCUMENTS

| | | | |
|---|---|---|---|
| 4,722,973 | 2/1988 | Yamaoka et al. | |
| 5,017,714 | 5/1991 | Welborn, Jr. | |
| 5,229,463 | * 7/1993 | Yano et al. | 525/194 |
| 5,308,699 | * 5/1994 | Hikasa et al. | 525/194 |
| 5,308,700 | * 5/1994 | Hikasa et al. | 525/194 |
| 5,464,905 | 11/1995 | Tsutsui et al. | |
| 5,525,675 | * 6/1996 | Masuda et al. | 525/194 |
| 5,656,693 | * 8/1997 | Ellul et al. | 525/194 |
| 5,919,864 | * 7/1999 | Watanabe et al. | 525/238 |
| 6,001,455 | * 12/1999 | Nishio et al. | 525/194 |

FOREIGN PATENT DOCUMENTS

| | | |
|---|---|---|
| 0 751 182 A1 | 1/1997 | (EP) . |
| WO 96/07681 | 3/1996 | (WO) . |
| WO 96/19534 | 6/1996 | (WO) . |

* cited by examiner

*Primary Examiner*—Donald R. Wilson
(74) *Attorney, Agent, or Firm*—Samuel Laferty; Daniel J. Hudak; William A. Skinner

(57) ABSTRACT

Random propylene thermoplastic copolymers can be used to increase the elongation to break and toughness of thermoplastic vulcanizates. Semi-crystalline polypropylene is a preferred thermoplastic phase. The rubber can be olefinic rubbers. Random thermoplastic polypropylene copolymers are different from conventional Ziegler-Natta propylene copolymers as the compositional heterogeneity of the copolymer is greater with Ziegler-Natta copolymers. This difference results in substantial differences in properties (elongation to break and toughness) between thermoplastic vulcanizates modified with random thermoplastic propylene copolymers and those modified with conventional Ziegler-Natta propylene copolymers. An increase in elongation to break results in greater extensibility in the articles made from a thermoplastic vulcanizate.

15 Claims, No Drawings

MODIFICATION OF THERMOPLASTIC VULCANIZATES USING RANDOM PROPYLENE COPOLYMERS

FIELD OF INVENTION

Thermoplastic vulcanizates from thermoplastic polypropylene and a rubber can be modified with a random propylene copolymer polymerized with single site catalyst such as metallocene catalyst. This modification typically results in an improved elongation to break and toughness.

BACKGROUND OF THE INVENTION

Thermoplastic vulcanizates are comprised of a thermoplastic phase and a crosslinked rubbery phase and desirably have the thermoplastic processing properties of the thermoplastic phase and a substantial amount of elasticity from the rubber phase. The Shore A/D hardness of a thermoplastic vulcanizate is generally controlled by the ratio of the harder thermoplastic phase to the softer rubber phase. The elongation to break of a thermoplastic vulcanizate is controlled try many factors including compatibility of the two phases, phase sizes, and added compatibilizers. It is desirable to be able to formulate a thermoplastic vulcanizate composition to have higher elongation to break and more toughness. Toughness is defined as the area under the stress strain curve when a tensile specimen of the thermoplastic vulcanizate is elongated to break.

SUMMARY OF THE INVENTION

Thermoplastic vulcanizates from a polypropylene thermoplastic phase and generally any rubber phase can be modified with random propylene copolymers polymerized with single site catalyst including metallocene catalyst to improve the physical properties of the thermoplastic vulcanizate. The random propylene copolymers can have from about 5 to about 25 weight percent of other ethylenically unsaturated monomers and more desirably from about 6 to about 20 weight percent of other ethylenically unsaturated monomers. Preferred ethylenically unsaturated monomers are ethylene or a monoolefin having from 4 to 20 carbon atoms. The residual of the random propylene copolymers is desirably repeat units derived from the polymerization of propylene. Desirable the repeat units from propylene are predominantly in either an isotactic or a syndiotactic configuration. The random propylene copolymer with crystallizable repeat units derived from propylene has a melting point above 0° C. The relative amount of the random propylene copolymer to the polypropylene thermoplastic is desirably from about 2 to about 400 parts by weight of random propylene copolymer per 100 parts by weight polypropylene thermoplastic and more desirably from about 5 to about 150 parts of random copolymer per 100 parts polypropylene thermoplastic. The propylene thermoplastic is desirably an isotactic polypropylene with a high melting temperature but can be any polypropylene other than said random copolymer. For the purpose of this specification we will distinguish between polypropylene thermoplastics which have a melting temperature of at least 120° C. and random propylene copolymer which have a melting temperature below 105. The rubbers can be traditional hydrocarbon robbers such as EPDM rubber, butyl rubber, halobutyl rubber, copolymers of p-methylstyrene and isobutylene, natural rubber, homopolymers of conjugated dienes, and copolymers of conjugated dienes or combinations thereof. Thermoplastic vulcanizates usually comprise from about 15 to about 75 parts of the thermoplastic phase and from about 25 to about 85 parts of the rubber phase based upon 100 parts total of the thermoplastic and rubber phases.

DETAILED DESCRIPTION

The random propylene copolymers used to modify the thermoplastic vulcanizates of this disclosure are copolymers of propylene with statistical insertion at least one other comonomer, other than propylene, into the polymer. Comonomers comprise ethylene and alpha-olefins having 4 to 20 carbon atoms. The arrangement of the propylene units is substantially isotactic or syndiotactic. The random propylene copolymers have narrow molecular weight distributions with a polydispersity index of less than 4. They can conveniently be prepared with single site catalyst, including metallocene catalysts, although the disclosure is not limited to those catalysts but rather to a random propylene copolymer and the thermoplastic vulcanizate composition with a random propylene copolymer. Metallocene catalyst are further described in U.S. Pat. No. 5,017,714 herein incorporated by reference for its teachings on making random propylene copolymers. The random propylene copolymers have a low level of crystallinity with a heat of fusion of less than 65 or 75 J/g.

Prior to the development of metallocene catalyst it was very difficult to prepare random propylene copolymers having narrow molecular weight distribution with a polydispersity index of less than 4 or 5 with more than about 3 or 6 weight percent of a second comonomer. Rubbery copolymers such as EPDM or EPR rubber were available. Now it is possible to prepare thermoplastic random copolymers with from about 2 to about 16 or 20 weight percent of a second comonomer or comonomers. Prior art pseudorandom propylene copolymer was made by a polymerization with a propylene feed and a second olefin feed, said second olefin generally having 2 or Hi to 8 or 12 carbon atoms, keeping a relatively constant feed ratio. The catalysts used would have several different active sites such that some sites incorporate the second olefin more efficiently than others. The different sites also can result in different polymer chain lengths. This results in a broad molecular weight distribution and a broad compositional distribution of propylene in the resulting polymer.

The random propylene copolymer of this invention desirably have a narrow compositional distribution. While not meant to be limited thereby, it is believed that the narrow composition distribution of the random propylene copolymer is important. We believe that the narrow compositional distribution is a result of using a single sited catalyst (such as metallocene) which allows only a single statistical mode of addition of ethylene and propylene. We believe this results in no statistically significant difference in the composition of the polymer among two polymer chains. The intermolecular composition distribution of the polymer is determined by thermal fractionation in a solvent. A typical solvent is a saturated hydrocarbon such as hexane or heptane. This thermal fractionation procedure is described below. Typically, approximately 75 percent by weight and more preferably 85 percent by weight of the polymer is isolated as a one or two adjacent, soluble fraction with the balance of the polymer in immediately preceding or succeeding fractions. Each of these fractions has a composition (weight percent ethylene content) with a difference of no greater than 20 weight percent (relative) of the average weight percent ethylene content of the random propylene copolymer component. The random propylene copolymer is narrow in compositional distribution if it meets the fractionation test outlined above.

In the random propylene copolymer the number and distribution of ethylene residues is consistent with the statistical polymerization of ethylene, propylene and optional amounts of diene. In stereoblock structures, the number of monomer residues of any one kind adjacent to one another is greater than predicted from a statistical distribution in random propylene copolymers with a similar composition. Historical polymers with stereoblock structure have a distribution of ethylene residues consistent with these blocky structures rather than a statistical distribution of the monomer residues in the polymer. The intramolecular composition distribution of the polymer may be determined by C-13 NMR which locates the ethylene residues in relation to the neighboring propylene residue. A statistical distribution of the ethylene and propylene sequences will result for a polymer if (1) it is made with a single sited catalyst, such as a single site metallocene catalyst, which allows only a single statistical mode of addition of ethylene and propylene and (2) it is made in a well mixed, continuous monomer feed stirred tank polymerization reactor which allows only a single polymerization mode for substantially all of the polymer chains and (3) the catalyst has a product of reactivity ratios for ethylene and propylene less than 1.2. These polymerization parameters are needed for the formation of a random propylene copolymer.

The random propylene copolymer preferably has a single melting point. The melting point is determined by DSC. Generally, the random propylene copolymer has a melting point between about 0, 25 or 30° C. and 105° C. Preferably, the melting point is between about 0, 25 or 30, or 40° and 90 or 100° C. Most preferably the melting point is between 40° C. and 90° C. For the purpose of this application a melting point will be the peak in the DSC determination of melting point. The random propylene copolymer preferably has a narrow molecular weight distribution (MWD) between about 1.5, 1.7 or 1.8 to about 3.5, 4.0 or 5.0, with a MWD between about 1.5, 1.8 or 2.0 to about 2.8 or 3.2 preferred.

The random propylene copolymer desirably comprises isotactically crystallizable alpha-olefin sequences, e.g., preferably propylene sequences (NMR). The crystallinity is, preferably, from about 2 to about 65 percent of homoisotactic polypropylene, preferably between 5 to 40 percent, as measured by the heat of fusion of annealed samples of the polymer.

The random propylene copolymer desirably comprises from about 75 or 80 to 95 percent by weight repeat units from propylene and from about 5 to about 20 or 25 percent by weight of repeat units from a linear or branched olefin other than propylene having 2 or from 4 to 8, 12, or 20 carbon atoms, preferably from about 80 to about 94 percent by weight repeat units from propylene and from about 6 to about 20 percent by weight of an alpha-olefin and most preferably, from about 80 or 82 to about 90 or 94 percent by weight repeat units from propylene and from about 6 or 10 to about 18 or 20 percent by weight and even more preferably between 10 to 16 percent by weight of said alpha-olefin and from about 84 to 90 percent by weight of propylene. Preferably said alpha-olefin is ethylene.

Notwithstanding, the recitation of a random propylene copolymer, it may be advantageous to add a mixture of two (preferred) or two or more random propylene copolymers. Each of the random propylene copolymers in the mixture of random propylene copolymers desirably satisfies the description of the individual random propylene copolymer. The random propylene copolymers can differ in their weight or number average molecular weight and more preferably differ in composition by having different amounts of comonomer incorporated in the copolymerization with propylene and different amounts of crystallinity. It is particularly advantageous to have a first random propylene copolymer having a melting point above 70° C. and with greater than 93 percent weight repeat units from propylene while the second random propylene copolymer has a melting point below 60° C. with less than 92 percent weight repeat units from propylene. Alternatively it is desirable that the first random propylene copolymer has between about 20 or 25 and about 65% of the crystallinity of a homoisotactic polypropylene, as measured by the heat of fusion of annealed samples. The second random propylene copolymer would desirably have less crystallinity than the first. It is believed that the first random propylene copolymer when used in conjunction with the second and a thermoplastic polypropylene, acts as an interfacial agent. Thus the first random copolymer can result in a morphology with a finer dispersion of a dispersed phase and any resultant properties from the finer (smaller particle size) dispersion. The ratio of the first and the second random propylene copolymer in this mixture may range from 95:5 to 5:95 with preference for ratios in the range 90:10 to 10:90.

We believe that the addition of random propylene copolymers which consist of two and less preferably more than two individual random propylene copolymers as described above will lead to improvements in the production and in the properties of the thermoplastic vulcanizate. The improvements in the production will include the ability to introduce pellets of a substantially amorphous random propylene copolymer (rubber) while the improvements in the properties will include improvements in the tensile strength, elongation at break, and low temperature impact strength beyond that which has been demonstrated by the addition of a single random propylene copolymer.

There is no particular limitation on the method for preparing the random propylene copolymer component of the invention. Random propylene copolymers may be obtained by copolymerizing propylene and an alpha-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or bitch process and may include use of chain transfer agents, scavengers, or other such additives as deemed applicable.

Generally, without limiting in any way the scope of the invention, one embodiment for carrying out the production of the random propylene copolymer is as follows: (1) liquid propylene is introduced in a stirred-tank reactor, (2) the catalyst system is introduced via nozzles in either the vapor or liquid phase, (3) feed ethylene gas is introduced either into the vapor phase of the reaction, or sparged into the liquid phase as is well known in the art, (4) the reactor contains a liquid phase composed substantially of propylene, together with dissolved alpha-olefin, preferably ethylene, and a vapor phase containing vapors of all monomers, (5) the reactor temperature and pressure may be controlled via reflux of vaporizing propylene (autorefrigeration), as well as by cooling coils, jackets, etc., (6) the polymerization rate is controlled by the concentration of catalyst, temperature, and (7) the ethylene (or other alpha-olefin) content of the polymer product is determined by the ratio of ethylene to propylene in the reactor, which is controlled by manipulating the relative feed rates of these components to the reactor.

For example, a typical polymerization process for the random propylene copolymer consists of a polymerization in the presence of a catalysts comprising a bis (cyclopentadienyl) metal compound and either 1) a non-coordinating compatible anion activator, or 2) an alumoxane activator. This comprises the steps of contacting ethylene and propylene with a catalyst in a suitable polymerization diluent, said catalyst comprising, for example, according to a preferred embodiment, a chiral metallocene catalyst, e.g., a bis (cyclopentadienyl) metal compound, as described in U.S. Pat. No. 5,198,401 which is herein incorporated by reference for purposes of U.S. practices, and an activator. The activator used may be an alumoxane activator or a non-coordination compatible anion activator.

The alumoxane activator is preferably utilized in an amount to provide a molar aluminum to metallocene ratio of from about 1:1 to about 20.000:1 or more. The non-coordinating compatible anion activator is preferably utilized in an amount to provide a molar ratio of biscyclopentadienyl metal compound to non-coordinating anion of 10:1 to about 1:1. The above polymerization reaction is conducted by reacting such monomers in the presence of such catalyst system at a temperature of from about −100° C. to about 300° C. for a time of from about 1 second to about 10 hours to produce a copolymer having a weight average molecular weight of from about 5,000 or less to about 1,000,000 or more and a molecular weight distribution of from about 1.8 to about 4.5.

While the process in some embodiments includes utilizing a catalyst system in the liquid phase (slurry, solution, suspension or bulk phase or combination thereof), according to other embodiments, high pressure fluid phase or gas phase polymerization can also be utilized. When utilized in a gas phase, slurry phase or suspension phase polymerization, the catalyst systems will preferably be supported catalyst systems. See, for example, U.S. Pat. No. 5,057,475 which is incorporated herein by reference for purposes of U.S. practice. Such catalyst systems can also include other well known additives such as, for example, scavengers. See, for example U.S. Pat. No. 5,153.157 which is incorporated herein by reference for purposes of U.S. practices. These processes may be employed without limitation of the type of reaction vessels and the mode of conducting the polymerization. As stated above, and while it is also true for systems utilizing a supported catalyst system, the liquid phase process comprises the steps of contacting ethylene and propylene with the catalyst system in a suitable polymerization diluent and reacting the monomers in the presence of the catalyst system for a time and at a temperature sufficient to produce an ethylene-propylene copolymer of the desired molecular weight and composition.

The random propylene copolymer can be 1) incorporated into the components used to form a thermoplastic vulcanizate (TPV), 2) blended with a TPV composition prior to vulcanization of the rubber component, or 3) added after said vulcanization of said TPV. The physical properties of the resulting blend may or may not vary depending upon whether the random propylene copolymer was added prior to or subsequent to vulcanization of the rubber phase. The random propylene copolymer can be considered a supplement to the semi-crystalline polypropylene of the thermoplastic vulcanizate or can be considered to be substituted on a weight basis for the semi-crystalline polypropylene in a thermoplastic vulcanizate. When the random propylene copolymer is added prior to vulcanization, it is anticipated that a majority of the random propylene copolymer is in the thermoplastic phase of the resulting thermoplastic vulcanizate, although it may be disproportionately present at the interface between the rubber phase and the thermoplastic phase. Since the secant modulus of the random propylene copolymer is lower than that of the semi-crystalline polypropylene, it is readily melt-blendable with the thermoplastic vulcanizate or the components thereof at the normal processing/mixing temperatures for the thermoplastic vulcanizate.

The major portion of polymers in the thermoplastic vulcanizate are the conventional polypropylene thermoplastic; the random propylene copolymer, and a crosslinkable rubber. Examples of conventional semi-crystalline polypropylene are polypropylene, its copolymers and mixtures thereof.

The total of the conventional semi-crystalline polypropylene and the random propylene copolymer is desirably from about 6 to about 85 weight percent, more desirably from about 7 to about 75, and preferably from about 8 to about 60 weight percent when based upon the total of the compounded thermoplastic vulcanizate. Desirably the rubber is from about 5 to about 70, more desirably about 10 to about 50 and preferably from about 15 to 45 weight percent of the thermoplastic vulcanizate. Desirably the other conventional components to TPV, e.g. fillers, oils, curatives, processing aids, etc., are from about 0, 1, 2, or 10 to about 87, 88 or 89 weight percent of the TPV, more desirably from about 0, 1, 2 or 15 to about 81, 82 or 83 and preferably from about 0, 1, 2, or 25 to about 75, 76 or 79 weight percent.

Minor amounts of other polymers may be added to modify flow properties, or as additives, such as polymeric antioxidants. Non-polymeric materials such as oils, fillers, diluents and additives (discussed in a later paragraph) may be present in large amounts. Amounts of most of the components to the blend will be specified either 1) per 100 parts by weight of the blend of the conventional semi-crystalline polypropylene, random propylene copolymer, and the rubber or 2) per 100 parts by weight of rubber.

The total of the semi-crystalline polypropylene and the random propylene copolymer is desirably from about 15 to about 80 parts by weight, more desirably from about 25 to about 75 parts by weight, and preferably from about 25 to about 50 parts by weight per 100 parts of the blend of semi-crystalline polypropylene, random propylene copolymer, and the rubber. The rubber is desirably from about 20 to about 85 parts by weight, more desirably from about 25 to about 75 parts by weight and preferably from about 50 to about 75 parts by weight per 100 parts by weight of said blend. If the amount of semi-crystalline polypropylene is based on the amount of rubber, it is desirably from about 17.5 to about 320 parts by weight, more desirably from about 33 to about 300 parts and preferably from about 33 to about 200 parts by weight per 100 parts by weight of the rubber.

The random propylene copolymer is desirably present in amounts from about 2 to about 400 parts per 100 parts of conventional polypropylene in the thermoplastic vulcanizate, noble desirably in amounts from about 5 to about 150 parts per 100 parts of polypropylene, still more desirably from about 10 or 25 to about 100 parts per 100 parts by weight of conventional polypropylene, and preferably from about 25 to about 80 parts by weight per 100 parts by weight of conventional polypropylene. Thus the random propylene copolymer may be present in amounts from about 4 to about 80 and more desirably about 4 or 20 to about 60 weight percent of the thermoplastic phase of the thermoplastic vulcanizate. Since the thermoplastic phase of the thermoplastic vulcanizate can be from about 15 to about 75 percent of the blend of the thermoplastic and rubber phase (without fillers, oils, etc.), the percentage of random propylene copolymer based upon the total weight of the thermoplastic vulcanizate can range from 1 or 2 to about 40, 50 or 60 weight percent based upon either the combined weight of the conventional polypropylene, random propylene copolymer and rubber components (without fillers, oils etc.).

The terms "blend" and "thermoplastic vulcanizate" used herein mean a mixture ranging from small particles of crosslinked rubber well dispersed in a semi-crystalline polypropylene matrix to co-continuous phases of the semi-crystalline polypropylene and a partially to fully crosslinked rubber or combinations thereof. The term "thermoplastic vulcanizate" indicates the rubber phase is at least partially vulcanized (crosslinked).

The term "thermoplastic vulcanizate" refers to compositions that may possess the properties of a thermoset elastomer and are reprocessable in an internal mixer. Upon reaching temperatures above the softening point or melting point of the semi-crystalline polypropylene phase, they can form continuous sheets and/or molded articles with what visually appears to be complete knitting or fusion of the thermoplastic vulcanizate under conventional molding or shaping conditions for thermoplastics.

Subsequent to dynamic vulcanization (curing) of the rubber phase of the thermoplastic vulcanizate, desirably less than 20 or 50 weight percent of the curable rubber is extractable from the specimen of the thermoplastic vulcanizate in boiling xylene. Techniques for determining extractable rubber as set forth in U.S. Pat. No. 4,31 1,628, are herein incorporated by reference.

The conventional semi-crystalline polypropylene comprises semi-crystalline thermoplastic polymers from the polymerization of monoolefin monomers (e.g. 2 to 10 carbon atoms) by a high pressure, low pressure, or intermediate pressure process: or by Ziegler-Natta catalysts, or by metallocene catalysts. It may have any tacticity (e.g. isotactic and syndiotactic) or be a copolymer such as impact modified polypropylene. Desirably the monoolefin monomers converted to repeat units are at least 80, 85 or 93 percent propylene. The polypropylene can be a homopolymer, a reactor copolymer polypropylene impact modified propylene, isotactic polypropylene syndiotactic polypropylene, impact copolymer polypropylene and other prior art propylene copolymers. Desirably it has a melting temperature peak of at least 120° C. and a heat of fusion of greater than 75, 80, or 90 J/g.

The rubber can be any rubber that can react and be crosslinked under crosslinking conditions. These rubbers can include natural rubber, EPDM rubber, butyl rubber, halobutyl rubber, halogenated (e.g. brominated) copolymers of p-alkylstyrene and an isomonoolefin having from 4 to 7 carbon atoms (e.g. isobutylene), butyl rubbers containing repeat units from divinyl benzene, homo or copolymers from at least one conjugated diene, or combinations thereof. EPDM, butyl and halobutyl rubbers are referred to as rubbers low in residual unsaturation and are preferred when the vulcanizate needs good thermal stability or oxidative stability. The rubbers low in residual unsaturation desirably have less than 10 weight percent repeat units having unsaturation. Desirably excluded from rubbers are acrylate rubber and epichlorohydrin rubber. For the purpose of this invention, copolymers will be used to define polymers from two or more monomers, and polymers can have repeat units from one or more different monomers.

The rubber is desirably an olefin rubber such as EPDM-type rubber. EPDM-type rubbers are generally terpolymers derived from the polymerization of at least two different monoolefin monomers having from 2 to 10 carbon atoms, preferably 2 to 4 carbon atoms, and at least one polyunsaturated olefin having from 5 to 20 carbon atoms. Said monoolefins desirably have the formula $CH_2=CH-R$ where R is H or an alkyl of 1–12 carbon atoms and are preferably ethylene and propylene. Desirably the repeat units from at least two monoolefins (and preferably from ethylene and propylene) are present in the polymer in weight ratios of 25:75 to 75:25 (ethylene:propylene) and constitute from about 90 to about 99.6 weight percent of the polymer. The polyunsaturated olefin can be a straight chained, branched, cyclic, bridged ring, bicyclic, fused ring bicyclic compound etc., and preferably is a nonconjugated diene. Desirably repeat units from the nonconjugated polyunsaturated olefin is from about 0.4 to about 10 weight percent of the rubber.

The rubber can be a butyl rubber, halobutyl rubber, or a halogenated (e.g. brominated) copolymer of p-alkylstyrene and an isomonoolefin of 4 to 7 carbon atoms. "Butyl rubber" is defined a polymer predominantly comprised of repeat units from isobutylene but including a few repeat units of a monomer which provides sites for crosslinking. The monomers which provide sites for crosslinking, can be a polyunsaturated monomer such as a conjugated diene or divinyl benzene. Desirably from about 90 to about 99.5 weight percent of the butyl rubber are repeat units derived from the polymerization of iso-butylene, and from about 0.5 to about 10 weight percent of the repeat units are front at least one polyunsaturated monomer having from 4 to 19 carbon atoms. Preferably the polyunsaturated monomer is isoprene or divinylbenzene. The polymer may be halogenated to further enhance reactivity in crosslinking. Preferably the halogen is present in amounts from about 0.1 to about 10 weight percent, more preferably about 0.5 to about 3.0 weight percent based upon the weight of the halogenated polymer; preferably the halogen is chlorine or bromine. The brominated copolymer of p-alkylstyrene, having from about 9 to 12 carbon atoms, and an isomonoolefin, having from 4 to 7 carbon atoms, desirably has from about 88 to about 99 weight percent isomonoolefin, more desirably from about 92 to about 98 weight percent, and from about 1 to about 12 weight percent p-alkylstyrene, more desirably from about 2 to about 8 weight percent based upon the weight of the copolymer before halogenation. Desirably the alkylstyrene is p-methylstyrene and the isomonoolefin is isobutylene. Desirably the percent bromine is from about 0.2 to about 8, more desirably from about 0.2 to about 3 weight percent based on the weight of the halogenated copolymer. The copolymer is a complementary amount, i.e., from about 92 to about 99.8, more desirably from about 97 to about 99.8 weight percent. These polymers arc commercially available from Exxon Chemical Co.

Other rubber such as natural rubber or synthetic homo or copolymers from at least one conjugated diene can be used in the dynamic vulcanizate. These rubbers arc higher in unsaturation than EPDM rubber and butyl rubber. The natural rubber and said homo or copolymers of a diene can optionally be partially hydrogenated to increase thermal and oxidative stability. The synthetic rubber can be nonpolar or polar depending on the comonomers. Desirably the homo or copolymers of a diene have at least 50 weight percent repeat units from at least one conjugated diene monomer having from 4 to 8 carbon atoms. Comonomers may be used and include vinyl aromatic monomer(s) having from 8 to 12 carbon atoms and acrylonitrile or alkyl-substituted acrylonitrile monomer(s) having from 3 to 8 carbon atoms. Other comonomers desirably used include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms. Examples of synthetic rubbers include synthetic polyisoprene, polybutadiene rubber, styrene-butadiene rubber, butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available.

The thermoplastic vulcanizates of this disclosure are generally prepared by melt-mixing in any order, the semi-crystalline polyolefin(s) (e.g. polypropylene thermoplastic), the random propylene copolymer, the rubber, and other ingredients (filler, plasticizer, lubricant, stabilizer, etc.) in a mixer heated to above the melting temperature of the polypropylene thermoplastic. The optional fillers, plasticizers, additives etc., can be added at this stage or later. After sufficient molten-state mixing to form a well mixed blend, vulcanizing agents (also known as curatives or crosslinkers) are generally added. In some embodiments it is preferred to add the vulcanizing agent in solution with a liquid, for example rubber processing oil, or in a masterbatch which is compatible with the other components. It is convenient to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete. The random polypropylene copolymer can be added before, during, or after vulcanization. After discharge from the mixer, the blend containing vulcanized rubber and the thermoplastic can be milled, chopped, extruded, pelletized, injection-molded, or processed by any other desirable technique. It is usually desirable to allow the fillers and a portion of any plasticizer to distribute themselves in the rubber or semi-crystalline polypropylene phase before the rubber phase or phases are crosslinked. Crosslinking (vulcanization) of the rubber can occur in a few minutes or less depending on the mix temperature, shear rate, and activators present for the curative. Suitable curing temperatures include from about 120° C. or 150° C. to about 250° C., more preferred temperatures are from about 150° C. or 170° C. to about 425° C. or 250° C. The mixing equipment can include Banbury™ mixers, Brabender™ mixers, multiroll mills and certain mixing extruders.

The thermoplastic vulcanizate can include a variety of additives. The additives include particulate fillers such as carbon black, silica, titanium dioxide, colored pigments, clay; zinc oxide; stearic acid; stabilizers; anti-degradants; flame retardants; processing aids; adhesives; tackifiers; plasticizers; wax; discontinuous fibers (such as world cellulose fibers) and extender oils. When extender oil is used it can be present in amounts from about 5 to about 300 parts by weight per 100 parts by weight of the blend of semi-crystalline polypropylene and rubber. The amount of extender oil (e.g., hydrocarbon oils and ester plasticizers) may also be expressed as from about 30 to 250 parts, and more desirably from about 70 to 200 parts by weight per 100 parts by weight of said rubber. When non-black fillers are used, it is desirable to include a coupling agent to compatibilize the interface between the non-black fillers and polymers. Desirable amounts of carbon black, when present, are from about 5 to about 250 parts by weight per 100 parts by weight of rubber.

Another component to the dynamic vulcanizate is the curative which crosslinks or vulcanizes the crosslinkable rubber phase. The type of curative used in this disclosure depends on the type of rubber to be crosslinked. The curatives for each type of rubber are conventional for those rubbers in thermoplastic vulcanizates and are used in conventional amounts. The curatives include, but are not limited to, phenolic resin curatives, sulfur curatives, with or without accelerators, accelerators alone, peroxide curatives, hydrosilation curatives using silicon hydride and platinum or peroxide catalyst, etc.

Thermoplastic vulcanizate compositions of the invention are useful for making a variety of articles such as tires, hoses, belts, gaskets, moldings and molded parts. They are particularly useful for making articles by extrusion, injection molding, blow molding, and compression molding techniques. They also are useful for modifying thermoplastic resins and in particular polyolefin resins. The compositions can be blended with thermoplastic resins using conventional mixing making a rubber modified thermoplastic resin. The properties of the modified thermoplastic resin depend upon the amount of thermoplastic vulcanizate composition blended.

The stress-strain properties of the compositions are determined in accordance with the test procedures set forth in ASTM D412. These properties include tension set (TS), ultimate tensile strength (UTS), 50 percent modulus (M50), 100 percent modulus (M100), and ultimate elongation at break (UE). The tear strength is measured according to ASTM D623. The hardness is measured according to ASTM D2240, with a 5 second delay using either the Shore A or Shore D scale. Compression set (CS) is determined in accordance with ASTM D-395, Method B, by compressing the sample for 22 hours at 100° C. Oil swell (OS) (percent change in weight) is determined in accordance with ASTM D-471 by submerging the specimen in IRM 903 oil and unless otherwise specified is for 24 hours at 125±2° C. Especially preferred compositions of the invention are rubbery compositions having tension set values of about 50 percent or less which compositions meet the definition for rubber as defined by ASTM Standards. V. 28, page 756 (D1566). More preferred compositions are rubbery compositions having a Shore D hardness of 60 or below, or a 100 percent modulus of 18 MPa or less, or a Young's modulus below 250 MPa.

EXAMPLES

The composition of ethylene propylene copolymers, which are used as comparative examples of Tables I–III, was measured as ethylene weight percent according to ASTM D 3900. The composition of the random propylene copolymer of Tables I–III was measured as ethylene weight percent according to the following technique. A thin homogeneous film of the copolymer, pressed at a temperature of about or greater than 150° C. was mounted on a Perkin Elmer PE 1760 infra red spectrophotometer. A full spectrum of the sample from 600 cm−1 to 400 cm−1 was recorded and the ethylene weight percent of the polymer was calculated according to Equation 1 as follows:

$$\text{ethylene wt. \%} = 82.585 - 111.987X + 30.045X^2 \quad \text{(Equation 1)}$$

wherein X is the ratio of the peak height at 1155 $cm^{-1}$ and peak height at either 722 $cm^{-1}$ or 732 $cm^{-1}$, which ever is higher.

Techniques for determining the molecular weight (Mn and Mw) and molecular weight distribution (MWD) are found in U.S. Pat. No. 4,540,753 (Cozewith, Ju and Verstrate) (which is incorporated by reference herein for purposes of U.S. practices) and references cited therein and in Macromolecules, 1988, volume 21. p 3360 (Verstrate et al) (which is herein incorporated by reference for purposes of U.S. practice) and references cited therein.

The procedure for Differential Scanning Calorimetry of Tables I–III follows. About 6 to 10 mg of a sheet of the polymer pressed at approximately 200° C. to 230° C. is removed with a punch die. This is annealed at room temperature for 80 to 100 hours At the end of this period, the sample is placed in a Differential Scanning Calorimeter (Perkin Elmer 7 Series Thermal Analysis System) and cooled to about −50° C. to about −70° C. The sample is heated at 20° C./min to attain a final temperature of about 200° C. to about 220° C. The thermal output is recorded as the area under the melting peak of the simple, which is typically peaked at about 30° C. to about 175° C. and occurs between the temperatures of about 0° C. and about 200° C., and is measured in Joules as a measure of the heat of fusion. The melting point is recorded as the temperature of the greatest heat absorption within the range of melting of the sample. Under these conditions, the melting point of the random propylene copolymer and the heat of fusion is lower than for a polypropylene homopolymer.

Composition distribution of the random propylene copolymer was measured as described below. About 30 gms. of the random propylene copolymer was cut into small cubes about ⅛″ on the side. This is introduced into the thick walled glass bottle closed with screw cap along with 50 mg of Irganox 1076, an antioxidant commercially available from Ciba-Geigy Corporation. Then, 425 ml of hexane (a principal mixture of normal and iso isomers) is added to the contents of the bottle and the sealed bottle is maintained at about 23° C. for 24 hours. At the end of this period, the solution is decanted and the residue is treated with additional hexane for an additional 24 hours. At the end of this period, the two hexane solutions arc combined and evaporated to yield a residue of the polymer soluble at 23° C. To the residue is added sufficient hexane to bring the volume to 425 ml and the bottle is maintained at about 31° C. for 24 hours in a covered circulating water bath. The soluble polymer is decanted and the additional amount of hexane is added for another 24 hours at about 31° C. prior to decanting. In this manner, fractions of the polymer soluble at 40° C., 48° C., 55° C. and 62° C. are obtained at temperature increases of approximately 8° C. between stages. Further, increases in temperature to 95° C. can be accommodated, if heptane, instead of hexane, is used as the solvent for all temperatures above about 60° C. The soluble polymers are dried, weighed and analyzed for composition, weight percent ethylene content, by the IR technique described above. Soluble fractions obtained in the adjacent temperature increases are the adjacent fractions in the specification above.

SPC-1 through SPC-5 were prepared in a manner described in the specification for polymerizing a random propylene copolymer. Table I describes the results of the GPC, composition ML and DSC analysis for the polymers and for some comparative polymers. EPR is Vistalon™ 457 an ethylene-propylene copolymer commercially available from EXXON Chemical Co., and ae PP is an experimental propylene copolymer containing 11.7 weight percent ethylene but no isotactic propylene sequences (i.e., it is totally amorphous). Experimental random propylene copolymers M-PP A through M-PP E and M-PP H are also characterized along with some conventional propylene copolymers and homopolymers. Table II describes the temperature and percent of each copolymer soluble in hexane at a certain temperature.

TABLE I

| SPC | (Mn) by GPC | (Mw) by GPC | Ethylene wt % by IR | Heat of fusion J/g | Melting Point by DSC (° C.) | ML (1 + 4)- @ 125° C. |
|---|---|---|---|---|---|---|
| SPC-1 | 102000 | 248900 | 7.3 | 71.9 | 84.7 | 14 |
| SPC-2 | 124700 | 265900 | 11.6 | 17.1 | 43.0 | 23.9 |
| SPC-3 | 121900 | 318900 | 16.4 | 7.8 | 42.2 | 33.1 |
| SPC-4 | | | 11.1 | 25.73 | 63.4 | 34.5 |
| SPC-5 | | | 14.7 | 13.2 | 47.8 | 38.4 |
| Expt M-PP A | | | 13.1 | 12.4 | 52.1 | 16.4 |
| Expt M-PP B | N/A | N/A | 12.1 | 22.5 | 54.1 | 11.6 |
| Expt M-PP C | N/A | N/A | 14.9 | 14.6 | 52.1 | 6.4 |
| Expt M-PP D | N/A | N/A | 9 | 40.5 | 81.8 | 34.7 |
| Expt M-PP E | N/A | N/A | 7.5 | 41.8 | 90.2 | 8.8 |
| Expt M-PP H | N/A | N/A | 7.3 | 35.6 | 85.1 | 14 |
| Comparative Polymers | | | | | | |
| EPR | — | — | 46.8 | not detected | not detected | — |
| aePP | — | — | 11.7 | not detected | not detected | — |
| Rexflex D100 | | | 0 | 23.9 | 154° C. | |
| Rexflex D1700 | | | 0 | 62.2 | 158° C. | |
| Rexflex D2300 | | | 0 | | 156° C. | |
| Rexflex D2330 | | | 0 | | — | |
| Impact Escorene PD 7302 | | | 9.5 | 84.1 | 163 | |
| Lyondell 51S07A | | | 0 | 92.9 | 164.7 | |

TABLE II

| SPC | Wt. % soluble at 23° C. | Wt. % soluble at 31° C. | Wt. % soluble at 40° C. | Wt. % soluble at 48° C. |
|---|---|---|---|---|
| Solubility of the Propylene Copolymers | | | | |
| SPC-1 | 1.0 | 2.9 | 28.3 | 68.5 |
| SPC-2 | 6.5 | 95.7 | — | — |
| SPC-3 | 51.6 | 52.3 | 2.6 | — |
| SPC-4 | 18.7 | 83.6 | — | — |
| SPC-5 | 36.5 | 64.2 | — | — |
| Comparative Polymers | | | | |
| EPR | 101.7 | — | — | — |
| aePP | 100.5 | — | — | — |

Sum of the fractions add up to slightly more than 100 due to imperfect drying of the polymer fractions.

Table III describes the composition of the fractions of the propylene copolymers obtained in Table II. Only fractions which have more than 4% of the total mass of the polymer have been analyzed for composition.

Table IV characterizes the compositions of thermoplastic vulcanizates (TPVs) used in later tables. The TPV's also comprise crosslinks from a crosslinking agent, and preferably fillers, oils, process aids, etc.

Table V compares an unmodified TPV from polypropylene and EDM to the same TPV modified with 1) a polypropylene homopolymer (Lyondell 51S70A), 2) four different random propylene copolymers (A–D), and 3) a conventional propylene copolymer.

The experimental inaccuracy in determination of the ethylene content is believed to about 0.4 wt. % absolute.

TABLE III

| SPC | soluble at 23° C. | soluble at 31° C. | soluble at 40° C. | soluble at 48° C. | soluble at 56° C. |
|---|---|---|---|---|---|
| | Weight Percent Ethylene in Fraction | | | | |
| SPC-1 | — | — | 8.0 | 7.6 | — |
| SPC-2 | 12.0 | 11.2 | — | — | — |
| SPC-3 | 16.8 | 16.5 | — | — | — |
| SPC-4 | 13.2 | 11.2 | — | — | — |
| SPC-5 | 14.9 | 14.6 | — | — | — |
| | Comparative Polymers | | | | |
| EPR | 46.8 | | | | |
| atactic ePP | 11.8 | | | | |

TABLE IV

Thermoplastic Vulcanizates: Rubber Type, Polypropylene Concentration and Rubber Concentration

| Thermoplastic Vulcanizate | Rubber Type | PP Concentration, wt. % | Rubber Concentration wt. % |
|---|---|---|---|
| TPV-1 | EPDM | 13.4% | 28.5% |
| TPV-2 | EPDM | 58.3% | 14.5% |
| TPV-3 | EPDM | 9.4% | 26.7% |
| TPV-4 | Nitrile | 15.0% | 48.0% |
| TPV-5 | Butyl | 16.0% | 42.0% |

TABLE V

Blends of an EPDM/Polypropylene TPV with Polypropylene or Metallocene Catalyzed Propylene Copolymers or Conventional Polypropylene Copolymer

| | 1C | 2C | 3C | 4 | 5 | 6 | 7 | 8C |
|---|---|---|---|---|---|---|---|---|
| TPV-1 | 100 | 100 | 100 | 100 | 100 | 100 | 100 | 100 |
| Lyondell 51S07A | | 6.7 | 13.4 | | | | | |
| Expt M-PP A | | | | 13.4 | | | | |
| Expt M-PP B | | | | | 13.4 | | | |
| Expt M-PP C | | | | | | 13.4 | | |
| Expt M-PP D | | | | | | | 13.4 | |
| Escorene PD9272 | | | | | | | | 13.4 |
| Final Brabender Torque | — | — | 650 | 540 | 500 | 510 | 575 | 480 |
| PP Copolymer Concentration, wt. | 0.0% | 0.0% | 0.0% | 11.8% | 11.8% | 11.8% | 11.8% | 11.8% |
| PP:PP Copolymer ratio | | | | | | | | |
| Hardness, Shore A | 61 | 70 | 83 | 61 | 63 | 60 | 70 | 77 |
| 50% Modulus, MPa | 1.73 | 2.67 | 3.65 | 1.66 | 1.83 | 1.54 | 2.46 | 3.12 |
| 100% Modulus, MPa | 2.45 | 3.46 | 4.46 | 2.25 | 2.45 | 2.10 | 3.16 | 3.88 |
| Tensile Strength, MPa | 5.73 | 6.95 | 8.68 | 6.45 | 6.63 | 5.22 | 10.05 | 8.39 |
| Ultimate Elongation, % | 401 | 439 | 433 | 530 | 514 | 492 | 585 | 471 |
| Toughness, MJ/m$^3$ | 14.0 | 21.0 | 25.2 | 19.7 | 19.8 | 16.0 | 31.4 | 25.3 |
| Tension Set, 100% elongation, 10 minutes, room temperature | | | | | | | | |
| % Set | 7.5% | 11.5% | 16.0% | 8.5% | 9.5% | 9.0% | 11.5% | 14.5% |
| Oil Swell, 24 hours, 125° C. | | | | | | | | |
| % wt gain | 91.2 | 81.6 | 71 | 148.4 | 146.8 | 143 | 118.1 | 131.4 |
| Compression Set 22, hours | | | | | | | | |
| % Set @ 100° C. | 23 | 31 | 39 | 47 | 40 | 43 | 37 | 41 |

TABLE VI

Effect of Random Propylene Copolymer Composition on Properties of TPV Blend

| | 9C | 10C | 11C | 12C | 13 | 14 | 15 | 16 | 17 | 18 | 19 | 20 |
|---|---|---|---|---|---|---|---|---|---|---|---|---|
| TPV-1 | 100 | 100 | 100 | 100 | 100 | 100 | 100 | 100 | 100 | 100 | 100 | 100 |
| Expt M-PP C | | | | | 3.35 | 6.7 | 10 | 13.4 | | | | |
| Expt M-PP D | | | | | | | | | 3.35 | 6.7 | 10.0 | 13.4 |
| PP:PP Copolymer Ratio | 100:0 | 100:0 | 100:0 | 100:0 | 100:25 | 100:50 | 100:75 | 100:100 | 100:25 | 100:50 | 100:75 | 100:100 |
| Final Brabender Torque | 380 | 360 | 390 | 390 | 360 | 360 | 360 | 360 | 400 | 400 | 430 | 440 |
| Physical Properties, Unaged | | | | | | | | | | | | |
| Hardness, Shore A | 62 | 62 | 62 | 62 | 61 | 59 | 58 | 58 | 64 | 66 | 67 | 69 |
| 50% Modulus, MPa | 1.70 | 1.73 | 1.72 | 1.72 | 1.63 | 1.59 | 1.53 | 1.51 | 1.91 | 2.13 | 2.18 | 2.36 |
| 100% Modulus, MPa | 2.39 | 2.41 | 2.40 | 2.41 | 2.30 | 2.22 | 2.12 | 2.07 | 2.61 | 2.83 | 2.89 | 3.06 |
| Tensile Strength, MPa | 5.43 | 5.83 | 5.78 | 5.19 | 5.38 | 5.16 | 5.05 | 5.49 | 6.06 | 7.81 | 8.22 | 10.23 |

TABLE VI-continued

Effect of Random Propylene Copolymer Composition on Properties of TPV Blend

| | | | | | | | | | | | | |
|---|---|---|---|---|---|---|---|---|---|---|---|---|
| Ultimate Elongation, % | 407 | 443 | 438 | 397 | 433 | 454 | 480 | 542 | 451 | 549 | 564 | 639 |
| Toughness, MJ/m$^3$ | 13.7 | 15.8 | 15.6 | 13.1 | 14.5 | 14.7 | 15.2 | 18.1 | 16.9 | 24.8 | 26.4 | 34.2 |
| *Tension Set, 100 % elongation, 10 minutes, room temperature* | | | | | | | | | | | | |
| % Set | 7.5 | 9.0 | 7.5 | 8.0 | 7.0 | 8.0 | 9.0 | 8.5 | 9.0 | 10.0 | 11.0 | 12.0 |
| *Compression Set, 22 hours* | | | | | | | | | | | | |
| % Set @ 100 C. | 24.1 | 26.4 | 25.6 | 27.3 | 29.9 | 33.1 | 39.8 | 46.2 | 28.9 | 35.2 | 28.2 | 37.2 |
| *Weight Gain* | | | | | | | | | | | | |
| % Swell @ 125 C. | 97.4 | 98.3 | 97.4 | 96.4 | 115.1 | 131.2 | 134.6 | 140.2 | | | | |
| Oil Swell, 24 hours, 125° C. | | | | | | | | | 104.8 | 145.1 | 141.7 | 183.3 |

| | 21 | 22 | 23 | 24 | 25 | 26 | 27 | 28 |
|---|---|---|---|---|---|---|---|---|
| TPV-1 | 100 | 100 | 100 | 100 | 100.0 | 100.0 | 100.0 | 100.0 |
| Expt M-PP E | 3.35 | 6.7 | 10.0 | 13.4 | | | | |
| Expt M-PP H | | | | | 3.4 | 6.7 | 10.0 | 13.4 |
| PP:PP Copolymer Ratio | 100:25 | 100:50 | 100:75 | 100:100 | 100:25 | 100:50 | 100:75 | 100:100 |
| Final Brabender Torque | 380 | 380 | 370 | 370 | | | | |
| *Physical Properties, Unaged* | | | | | | | | |
| Hardness, Shore A | 65 | 67 | 69 | 70 | 65 | 66 | 69 | 70 |
| 50% Modulus, MPa | 1.97 | 2.12 | 2.30 | 2.45 | 2.00 | 2.18 | 2.34 | 2.47 |
| 100% Modulus, MPa | 2.66 | 2.82 | 2.99 | 3.14 | 2.70 | 2.91 | 3.04 | 3.18 |
| Tensile Strength, MPa | 6.66 | 7.43 | 8.28 | 8.52 | 7.25 | 8.11 | 8.90 | 9.65 |
| Ultimate Elongation, % | 499 | 536 | 568 | 567 | 522 | 548 | 587 | 601 |
| Toughness, MJ/m$^3$ | 20.06 | 23.5 | 27.0 | 27.9 | 22.13 | 25.46 | 29.07 | 31.69 |
| *Tension Set, 100 % elongation, 10 minutes, room temperature* | | | | | | | | |
| % Set | 9.0 | 10.0 | 12.0 | 12.5 | 9.5 | 10.5 | 11.5 | 12.0 |
| *Compression Set, 22 hours* | | | | | | | | |
| % Set @ 100 C. | 29.1 | 35.2 | 35.7 | 36.1 | | | | |
| *Weight Gain* | | | | | | | | |
| Oil Swell, 24 hours, 125° C. | 106.9 | 133.8 | 148.7 | 157.4 | | | | |

Table VI illustrates the properties of four different random propylene copolymers at different levels in a TPV.

Table VII shows the effect of adding a random propylene copolymer in four different amounts to a thermoplastic vulcanizates (TPV). The amounts of the random propylene copolymer are higher than shown in the previous tables. As can be seen from reading the table from left to right the experimental polypropylene copolymer increases the elongation to break, increases the toughness and increases the tear strength of the compositions. Due to the fact that the thermoplastic random propylene copolymer increases the relative ratio of the thermoplastic phase in these examples it generally increases the Shore A hardness and the modulus as the amount of random propylene copolymer increases.

Table VIII contains control examples that illustrate the effect of adding polypropylene homopolymers. While toughness increases, it is more a function of modulus increase than an increase in ultimate elongation.

Table IX illustrates the effect of adding traditional propylene copolymers to a TPV. Again as with propylene homopolymers, increases in toughness are due primarily to increases in modulus.

TABLE VII

Physical Properties of blends of TPV M-PP Copolymer where the M-PP copolymer concentration is greater than the PP homopolymer concentration

| | 29C | 30 | 31 | 32 | 33 |
|---|---|---|---|---|---|
| *Formulation, Phr* | | | | | |
| TPV-1 | 100.0 | 100.0 | 100.0 | 100.0 | 100.0 |
| Expt M-PP D | | 13.40 | 26.80 | 40.20 | 53.60 |
| PP:PP Copolymer Ratio | 100:0 | 100:100 | 100:200 | 100:300 | 100:400 |
| *Physical Properties, Unaged* | | | | | |
| Hardness, Shore A | 61 | 65 | 70 | 71 | 75 |
| 50% Modulus, MPa | 1.62 | 2.20 | 2.58 | 2.95 | 3.26 |
| 100% Modulus, MPa | 2.31 | 2.90 | 3.25 | 3.58 | 3.85 |
| Tensile Strength, MPa | 5.39 | 8.42 | 13.60 | 17.40 | 18.80 |
| Ultimate Elongation, % | 424 | 566 | 716 | 776 | 785 |
| Toughness, MJ/m$^3$ | 14.07 | 26.86 | 45.73 | 58.58 | 63.82 |
| Tension Set, % set | 7.5 | 12.5 | 15 | 17 | 18 |

TABLE VIII

Effect of Low Density Polypropylene on TPV Blends

|  | 34C | 35C | 36C | 37C | 38C | 39C | 40C |
|---|---|---|---|---|---|---|---|
| TPV-1 | 100 | 100 | 100 | 100 | 100 | 100 | 100 |
| Lyondell 51S70A[1] |  | 13.4 |  |  |  |  |  |
| Rexflex ® D100 |  |  | 13.4 |  |  |  |  |
| Rexflex ® D1700 |  |  |  | 13.4 |  |  |  |
| Rexflex ® D2300 |  |  |  |  |  | 13.4 |  |
| Rexflex ® D2330 |  |  |  |  |  |  | 13.4 |
| *Physical Properties, Unaged* | | | | | | | |
| Hardness, Shore A | 63 | 81 | 65 | 75 | 63 | 70 | 68 |
| 50% Modulus, MPa | 1.72 | 3.47 | 2.00 | 2.72 | 1.72 | 2.21 | 2.12 |
| 100% Modulus, MPa | 2.41 | 4.28 | 2.65 | 3.46 | 2.42 | 2.87 | 2.78 |
| Tensile Strength, MPa | 5.79 | 8.61 | 4.92 | 7.23 | 5.61 | 5.41 | 4.74 |
| Ultimate Elongation, % | 441 | 477 | 402 | 496 | 426 | 440 | 364 |
| Toughness, MJ/m$^3$ | 15.7 | 27.3 | 13.5 | 23.5 | 14.8 | 16.4 | 12.1 |
| *Tension Set, 100% elongation, 10 minutes, room temperature* | | | | | | | |
| % Set | 8.5 | 16.0 | 10.0 | 12.0 | 8.5 | 9.5 | 9.5 |
| *Compression Set, 22 hours* | | | | | | | |
| % Set @ 100 C. | 28.9 | 38.3 | 42.0 | 37.4 | 27.0 | 39.0 | 39.1 |
| *% wt. gain* | | | | | | | |
| % Swell @ 125 C. | 96.3 | 75.5 | 128.9 | 112.0 | 94.1 | 130.5 | 121.2 |
| % Swell @ 100 C. | 80.3 | 59.2 | 115.0 | 84.6 | 80.8 | 110.3 | 108.6 |

TABLE IX

Physical Properties of TPV Blends with Non-Metallocene Polypropylene Copolymers

|  | 41C | 42C | 43C | 44C | 45C |
|---|---|---|---|---|---|
| TPV-1 | 100 | 100 | 100 | 100 | 100 |
| Escorene PD9272 |  | 3.34 | 13.4 |  |  |
| Escorene PD 7032 |  |  |  | 3.34 | 13.4 |
| PP:PP Copolymer Ratio | 100:0 | 100:25 | 100:100 | 100:25 | 100:100 |
| Final Brabender Torque | 361 | 350 | 320 | 345 | 340 |
| *Physical Properties, Unaged* | | | | | |
| Hardness, Shore A | 63 | 81 | 76 | 67 | 78 |
| 50% Modulus, MPa | 1.70 | 2.02 | 2.99 | 2.00 | 3.08 |
| 100% Modulus, MPa | 2.38 | 2.73 | 3.74 | 2.71 | 3.83 |
| Tensile Strength, MPa | 5.92 | 6.12 | 8.50 | 6.06 | 7.34 |
| Ultimate Elongation, % | 462 | 449 | 531 | 438 | 451 |
| Toughness, MJ/m$^3$ | 16.6 | 17.4 | 28.3 | 16.8 | 22.6 |
| Tear Strength (N/mm) | 22.28 | 26.71 | 36.42 | 25.32 | 33.76 |
| *Tension Set, 100% elongation, 10 minutes, room temperature* | | | | | |
| % Set | 7.4 | 8.5 | 13.5 | 9.00 | 13.0 |
| *Compression Set, 22 hours* | | | | | |
| % Set @ 100 C. | 27.6 | 29.9 | 41.5 | 29.3 | 37.6 |
| % Set @ RT | 15.0 | 17.9 | 27.3 | 17.9 | 22.6 |
| *Weight Gain* | | | | | |
| % Swell @ 125 C. | 96.2 | 104.5 | 137.2 | 154.1 | 89.6 |
| % Swell @ 60° C. | 65.0 | 60.6 | 49.20 | 57.2 | 50.5 |

Table X illustrates that the effect of the random propylene copolymers occurs in both TPV-1 (13.4 weight percent polypropylene) and TPV-2 (58.3 weight percent polypropylene).

Table XI compares 1) TPV-3 (9.4 weight percent polypropylene) with 2) TPV-3 with a random propylene copolymer and 3) TPV-1 which has 13.4 weight percent polypropylene. The toughness increase in examples 54 and 55 is a result of the random propylene copolymers rather than just the percentage poly-propylene.

Table XII illustrates the effect of adding a random propylene copolymer before or after the curing (vulcanization) of the rubber phase.

Table XIII illustrates the effect of a random propylene copolymer on TPV's 4 and 5 which use nitrile rubber and butyl rubber respectively (rather than EPDM rubber as used in TPV-1 through 3 in the previous tables).

TABLE X

Physical Properties of Harder TPV Blends with Random Propylene Copolymers

|  | 46C avg. 4 | 47 | 48 | 49 | 50 | 52 | 52 |
|---|---|---|---|---|---|---|---|
| TPV-2 | 100.00 | 100.0 | 100.0 | 100.0 | 100.0 | 100.0 | 100.0 |
| Expt M-PP D |  | 11.2 | 24.9 | 43.9 |  |  |  |
| Expt M-PP C |  |  |  |  | 11.2 | 24.9 | 43.9 |
| PP:PP Copolymer Ratio | 100:0 | 100:19 | 100:43 | 100:74 | 100:19 | 100:43 | 100:74 |
| Final Brabender Torque | 570 | 600 | 640 | 680 | 530 | 500 | 500 |

TABLE X-continued

Physical Properties of Harder TPV Blends with Random Propylene Copolymers

|  | 46C avg. 4 | 47 | 48 | 49 | 50 | 52 | 52 |
|---|---|---|---|---|---|---|---|
| Physical Properties, Unaged | | | | | | | |
| Hardness, Shore D | 55.5 | 55 | 54 | 53 | 53 | 50 | 44 |
| 50% Modulus, MPa | 15.1 | 14.7 | 14.1 | 13.0 | 13.1 | 10.8 | 9.03 |
| 100% Modulus, MPa | 14.5 | 14.1 | 13.5 | 12.7 | 12.7 | 10.8 | 9.44 |
| Tensile Strength, MPa | 16.9 | 22.0 | 26.3 | 27.6 | 18.1 | 19.9 | 20.4 |
| Ultimate Elongation, % | 438 | 586 | 715 | 725 | 545 | 678 | 700 |
| Toughness, MJ/m$^3$ | 64.9 | 91.0 | 119.6 | 117.8 | 75.3 | 89.2 | 87.2 |
| Tension Set, 100% elongation, 10 minutes, room temperature | | | | | | | |
| % Set |  | 60.5 | 58.0 | 59.5 | 48.0 | 54.5 | 48.5 | 39.5 |

TABLE XI

Effect of Random Propylene Copolymer on TPV-3 and Comparison to TPV-1

|  | 53C | 54 | 55 | 56C |
|---|---|---|---|---|
| TPV-3 | 100.00 | 100.0 | 100.0 |  |
| TPV-1 |  |  |  | 100.00 |
| Expt M-PP D |  | 6.4 | 13.6 |  |
| PP:PP Copolymer Ratio | 100:0 | 100:68 | 100:144 | 100:0 |
| Final Brabender Torque | 240 | 250 | 275 | 380 |
| Physical Properties, Unaged | | | | |
| Hardness, Shore A | 34 | 41 | 48 | 62 |
| 50% Modulus, MPa | 0.57 | 0.86 | 1.08 | 1.68 |
| 100% Modulus, MPa | 0.94 | 1.30 | 1.55 | 2.34 |
| Tensile Strength, MPa | 2.64 | 4.31 | 6.30 | 5.71 |
| Ultimate Elongation, % | 429 | 586 | 730 | 451 |
| Toughness, MJ/m$^3$ | 6.8 | 14.7 | 24.8 | 15.8 |
| Tension Set, 100% elongation, 10 minutes, room temperature | | | | |
| % Set | 5.0 | 6.50 | 7.00 | 8.00 |
| Compression Set, 22 hours | | | | |
| % Set @ 100 C. | 21.2 | 29.9 | 36.7 | 27.6 |
| Weight Gain | | | | |
| % Swell @ 125 C. | 133.7 | 178.5 | 239.8 | 95.1 |
| % Swell @ 60 C. | 93.5 | 87.9 | 72.6 | 59.9 |
| Tear Strength (N/mm) | 10.81 | 17.29 | 23.26 | 22.35 |

TABLE XII

Effect of Adding Random Propylene Copolymer before or after Vulcanization

|  | 57C | 58 | 59 | 60C | 61 | 62 | 63 | 64 |
|---|---|---|---|---|---|---|---|---|
| TPV-1 | 100.0 | 100.0 | 100.0 | 100.0 | 100.0 | 100.0 | 100.0 | 100.0 |
| Expt M-PP C |  | 13.3 | 13.3 |  |  |  |  |  |
| Expt M-PP E |  |  |  |  |  |  | 13.3 | 13.3 |
| Expt M-PP D |  |  |  |  | 13.3 | 13.3 |  |  |
| Mixing temp ° C. | 175 | 175 | 175 | 175 | 175 | 175 | 175 | 175 |
| PP Copolymer/Addition Sequence | N/A | before cure | before cure | N/A | before cure | after cure | before cure | after cure |
| PP Copolymer Concentration wt. % | 0% | 11.8 | 11.8 | 0 | 11.8 | 11.8 | 11.8 | 11.8 |
| PP:PP Copolymer Ratio | 100:0 | 100:100 | 100:100 | 100:0 | 100:100 | 100:100 | 100:100 | 100:100 |
| Final Brabender Torque | 440 | 320 | 380 | 400 | 420 | 530 | 310 | 350 |
| Physical Properties | | | | | | | | |
| Hardness, Shore A | N/A | N/A | N/A | 59 | 70 | 68 | 71 | 70 |
| 50% Modulus, MPa | 1.6 | 1.4 | 1.4 | 1.5 | 2.3 | 2.3 | 2.5 | 2.3 |
| 100% Modulus, MPa | 2.5 | 2.0 | 2.0 | 2.2 | 3.1 | 3.1 | 3.2 | 3.2 |
| Tensile Strength, MPa | 4.7 | 3.6 | 4.2 | 4.5 | 6.9 | 7.4 | 6.4 | 7.1 |
| Toughness, MJ/m$^3$ | 7.6 | 7.6 | 9.0 | 8.8 | 18.3 | 19.5 | 17.3 | 18.2 |
| Ultimate Elongation, % | 265 | 316 | 339 | 311 | 426 | 438 | 416 | 412 |
| Oil Swell, 24 hrs at 125 C. | 87.8 | 123.4 | 135.2 | 117.0 | 158.5 | 167.7 | 135.5 | 152.3 |
| Compression Set, 22 hours | | | | | | | | |
| @ 100C, % Set | 24.2 | 49.6 | 49.3 | 32.2 | 39.4 | 36.6 | 39.7 | 42.1 |
| @ RT | 13.7 | 21.1 | 22.2 | 16.8 | 21.0 | 18.3 | 20.8 | 20.5 |
| Tear Strength | 18.65 | 19.50 | 20.48 | 21.2 | 29.3 | 32.29 | 29.70 | 31.75 |
| Tension Set, % | 5.5 | 8.0 | 8.0 | 6.5 | 9.5 | 11.0 | 11.5 | 11.5 |

TABLE XIII

Physical Properties of blends of TPV and PP or PP Copolymer Where the TPV Rubber is Nitrile Rubber and Butyl Rubber

|  | 65C | 66 | 67 | 68C | 69C | 70 | 71 | 72 | 73C | 74 |
|---|---|---|---|---|---|---|---|---|---|---|
| *Formulation, phr* | | | | | | | | | | |
| TPV-4 | 100.0 | 100.0 | 100.0 | 100.0 | 100.0 | | | | | |
| TPV-5 | | | | | | 100.0 | 100.0 | 100.0 | 100.0 | 100.0 |
| Expt M-PP D | | 6 | 12 | | | | 6 | 12 | | |
| Lyondell 51S07A | | | | 2 | 4 | | | | 2 | 4 |
| PP Copolymer Concentration | 0.0% | 5.7% | 10.7% | 0.0% | 0.0% | 0.0% | 5.7% | 10.7% | 0.0% | 0.0% |
| PP:PP Copolymer Ratio | 100:0 | 100:40 | 100:80 | 100:0 | 100:0 | 100:0 | 100:38 | 100:75 | 100:0 | 100:0 |
| Rubber Type | Nitrile | Nitrile | Nitrile | Nitrile | Nitrile | Butyl | Butyl | Butyl | Butyl | Butyl |
| *Physical Properties, Ungaged* | | | | | | | | | | |
| Hardness, Shore A | 69 | 71 | 74 | 71 | 73 | 57 | 61 | 65 | 61 | 66 |
| 50% Modulus, MPa | 2.39 | 2.89 | 3.07 | 2.94 | 3.20 | 1.50 | 1.84 | 2.09 | 1.81 | 2.06 |
| 100% Modulus, MPa | 3.36 | 3.85 | 4.01 | 3.97 | 4.29 | 2.24 | 2.61 | 2.86 | 2.62 | 2.92 |
| Tensile Strength, MPa | 5.58 | 7.51 | 9.15 | 6.44 | 7.03 | 6.16 | 7.44 | 8.30 | 6.46 | 7.11 |
| Ultimate Elongation, % | 219 | 283 | 335 | 232 | 236 | 343 | 386 | 410 | 336 | 348 |
| Toughness, MJ/m$^3$ | 7.61 | 12.91 | 17.76 | 9.65 | 10.70 | 11.33 | 15.41 | 18.22 | 12.28 | 14.15 |
| Tension Set, % set | 8.5 | 12.0 | 14.0 | 9.5 | 11.0 | 7.5 | 10.0 | 12.0 | 9.5 | 11.0 |

While in accordance with the patent statutes the best mode and preferred embodiment has been set forth, the scope of the invention is not limited thereto, but rather by the scope of the attached claims.

What is claimed is:

1. A thermoplastic vulcanizate composition, comprising; from about 20 to about 85 parts by weight of a rubber and from about 15 to about 80 parts by weight of a semi-crystalline isotactic polypropylene and a random isotactic propylene copolymer modifier, wherein said parts by weight are based upon 100 parts by weight of said rubber, said random isotactic propylene copolymer modifier, and said semi-crystalline isotactic polypropylene, wherein said semi-crystalline isotactic polypropylene consists essentially of a polypropylene homopolymer, or a polypropylene copolymer made from propylene and a mono-olefin containing 2 or 4 to 10 carbon atoms, and wherein said random isotactic propylene copolymer modifier consists essentially of from about 80 to about 95 weight percent repeat units from propylene and from about 5 to about 20 weight percent of repeat units from one or more other unsaturated olefin monomers having 2 or 4 to 12 carbon atoms based upon the weight of said random isotactic propylene copolymer, and wherein said random isotactic propylene is prepared using a metallocene catalyst system;

wherein the weight ratio of said semi-crystalline isotactic polypropylene to said random isotactic propylene copolymer modifier is from about 100:2 to 100:400, wherein said semi-crystalline isotactic polypropylene has a heat of fusion of greater than 80 joules/gram, and wherein said random isotactic propylene copolymer has a heat of fusion of less than 75 joules/gram, wherein said rubber is selected from the group consisting of ethylene-propylene-diene rubber, natural rubber, butyl rubber, halobutyl rubber, halogenated rubber copolymer of p-alkylstyrene and at least one isomonoolefin having 4 to 7 carbon atoms, a copolymer of isobutylene and divinyl-benzene, a rubber homopolymer of a conjugated diene having from 4 to 8 carbon atoms, a rubber copolymer having at least 50 weight percent repeat units from at least one conjugated diene having from 4 to 8 carbon atoms and a vinyl aromatic monomer having from 8 to 12 carbon atoms, or acrylonitrile monomer, or an alkyl substituted acrylonitrile monomer having from 3 to 8 carbon atoms, or an unsaturated carboxylic acid monomer, or an unsaturated dicarboxylic acid monomer, or an unsaturated anhydride of a dicarboxylic acid, and combinations thereof, and wherein the curative to prepare the vulcanizate composition of said rubber is selected from the group consisting of a phenolic resin curative, a sulfur curative, and a hydrosilation curative.

2. A composition according to claim 1, wherein said rubber was dynamically vulcanized in the presence of said semi-crystalline isotactic polypropylene or the random isotactic propylene copolymer or both, thereby forming said thermoplastic vulcanizate.

3. A composition according to claim 2, wherein said random isotactic propylene copolymer has a peak melting temperature between about 25° C. and about 105° C.

4. A composition according to claim 3, wherein one or more olefin monomers polymerized in said random isotactic propylene copolymer comprises at least one olefin having from 2 or 4 to 8 carbon atoms.

5. A thermoplastic vulcanizate composition according to claim 3, wherein said peak melting temperature is from about 30 to about 105° C.

6. A composition according to claim 3, wherein said peak melting temperature is from about 40 to about 100° C.

7. A composition according to claim 5, wherein said semi-crystalline polypropylene has a melting temperature of at least 120° C. and said composition further includes at least one oil, and at least one filler.

8. A composition according to claim 5, wherein said random isotactic propylene copolymer comprises from about 80 to about 95 weight percent repeat units from propylene and from about 5 to about 20 weight percent repeat units from at least one monoolefin having from 2 or 4 to 8 carbon atoms.

9. A composition according to claim 5, wherein said random isotactic propylene copolymer comprises from about 80 to about 90 weight percent repeat units from propylene and from about 10 to about 20 weight percent repeat units from at least one monoolefin having from 2 or 4 to 8 carbon atoms.

10. A composition according to claim 1, wherein said rubber is said ethylene-propylene-diene rubber.

11. A composition according to claim 1, wherein said rubber is butyl rubber, halobutyl rubber, or a halogenated rubber copolymer of p-alkylstyrene and isobutylene.

12. A composition according to claim 1, wherein said rubber is natural rubber.

13. A composition according to claim 1, wherein said rubber is a rubber homopolymer of a conjugated diene having from 4 to 8 carbon atoms, a rubber copolymer having at least 50 weight percent repeat units from at least one conjugated diene having from 4 to 8 carbon atoms, or combinations thereof.

14. A composition according to claim 1, wherein said composition has at least a 25% increase in toughness as measured in units of $MJ/m^3$, and a less than 5 percent increase in 50% or 100% modulus as measured according to ASTM D412, over a similar composition wherein the semi-crystalline isotactic polypropylene totally replaces the combination of semi-crystalline isotactic polypropylene and random isotactic propylene copolymer.

15. A composition according to claim 1, wherein said composition has at least a 25 percent reduction in tension set after 100 percent elongation for 10 minutes at 23±2° C. over a similar composition wherein the semi-crystalline isotactic polypropylene totally replaces the combination of semi-crystalline isotactic polypropylene and random isotactic propylene copolymer.

* * * * *